(12) United States Patent
Manzella et al.

(10) Patent No.: US 8,949,578 B2
(45) Date of Patent: Feb. 3, 2015

(54) SHARING OF INTERNAL PIPELINE RESOURCES OF A NETWORK PROCESSOR WITH EXTERNAL DEVICES

(75) Inventors: Joseph A. Manzella, Macungie, PA (US); Nilesh S. Vora, Fogelsville, PA (US); Walter A. Roper, Lebanon, NJ (US); Robert J. Munoz, Round Rock, TX (US); David P. Sonnier, Austin, TX (US)

(73) Assignee: LSI Corporation, Milpitas, CA (US)

( * ) Notice: Subject to any disclaimer, the term of this patent is extended or adjusted under 35 U.S.C. 154(b) by 235 days.

(21) Appl. No.: 13/568,365

(22) Filed: Aug. 7, 2012

(65) Prior Publication Data

US 2012/0300772 A1 Nov. 29, 2012

Related U.S. Application Data

(63) Continuation-in-part of application No. 12/782,379, filed on May 18, 2010, and a continuation-in-part of application No. 12/782,393, filed on May 18, 2010, now Pat. No. 8,255,644, and a continuation-in-part of application No. 12/782,411, filed on May 18, 2010, now Pat. No. 8,407,707.

(60) Provisional application No. 61/580,183, filed on Dec. 23, 2011.

(51) Int. Cl.
*G06F 15/00* (2006.01)
*G06F 15/76* (2006.01)
*G06F 15/167* (2006.01)
*H04L 12/937* (2013.01)

(52) U.S. Cl.
CPC ............ *G06F 15/167* (2013.01); *H04L 49/254* (2013.01)

USPC .......................................................... 712/29

(58) Field of Classification Search
None
See application file for complete search history.

(56) References Cited

U.S. PATENT DOCUMENTS

| | | | |
|---|---|---|---|
| 4,123,795 A | 10/1978 | Dean, Jr. et al. | |
| 4,622,631 A | 11/1986 | Frank et al. | |
| 5,394,534 A | 2/1995 | Kulakowski et al. | |
| 5,623,698 A | 4/1997 | Stephenson et al. | |

(Continued)

FOREIGN PATENT DOCUMENTS

JP H02-271444 11/1990

OTHER PUBLICATIONS

Horst; Task-Flow Architecture for WSI Parallel Processing; 1992; IEEE.*

(Continued)

*Primary Examiner* — Corey S Faherty
(74) *Attorney, Agent, or Firm* — Daniel J. Santos; Smith Risley Tempel Santos LLC

(57) ABSTRACT

Described embodiments provide a system having at least two network processors that each have a plurality of processing modules. The processing modules process a packet in a task pipeline by transmitting task messages to other processing modules on a task ring, the task messages related to desired processing of the packet. A series of tasks within a network processor may result in no processing or reduced processing for certain processing modules creating a virtual pipeline depending on the packet received by the network processor. At least two of the network processors communicate tasks. This communication allows ter the extension of the virtual pipeline of or IC network processor to at least two network processors.

20 Claims, 8 Drawing Sheets

(56) References Cited

U.S. PATENT DOCUMENTS

| | | |
|---|---|---|
| 5,838,931 A | 11/1998 | Regenold et al. |
| 5,892,766 A | 4/1999 | Wicki et al. |
| 5,893,120 A | 4/1999 | Nemes |
| 5,909,695 A | 6/1999 | Wong et al. |
| 5,943,283 A | 8/1999 | Wong et al. |
| 5,974,421 A | 10/1999 | Krishnaswamy et al. |
| 6,026,467 A | 2/2000 | Petty |
| 6,038,630 A | 3/2000 | Foster et al. |
| 6,052,697 A | 4/2000 | Bennett et al. |
| 6,115,802 A | 9/2000 | Tock et al. |
| 6,195,335 B1 | 2/2001 | Calvignac et al. |
| 6,216,167 B1 | 4/2001 | Momirov |
| 6,233,246 B1 | 5/2001 | Hareski et al. |
| 6,289,013 B1 | 9/2001 | Lakshman et al. |
| 6,341,130 B1 | 1/2002 | Lakshman et al. |
| 6,567,564 B1 | 5/2003 | van der Wal |
| 6,584,546 B2 | 6/2003 | Kavipurapu |
| 6,636,932 B1 | 10/2003 | Regev et al. |
| 6,658,012 B1 | 12/2003 | Baucom, Jr. et al. |
| 6,839,830 B2 | 1/2005 | Liu |
| 6,914,882 B2 | 7/2005 | Merani et al. |
| 7,058,057 B2 | 6/2006 | Dooley et al. |
| 7,085,911 B2 | 8/2006 | Sachedina et al. |
| 7,089,346 B2 | 8/2006 | Cebulla et al. |
| 7,159,219 B2 | 1/2007 | Chen et al. |
| 7,234,018 B1 | 6/2007 | Purcell et al. |
| 7,287,046 B2 | 10/2007 | Bulka et al. |
| 7,397,809 B2 | 7/2008 | Wang |
| 7,453,898 B1 | 11/2008 | Cohen et al. |
| 7,461,208 B1 | 12/2008 | Caprioli et al. |
| 7,461,407 B2 | 12/2008 | Little et al. |
| 7,512,740 B2 | 3/2009 | Diefendorff |
| 7,519,065 B2 | 4/2009 | Angle et al. |
| 7,554,464 B1 | 6/2009 | Oberdorfer |
| 7,594,028 B1 | 9/2009 | Jacobs et al. |
| 7,596,142 B1 | 9/2009 | MacAdam |
| 7,600,078 B1 | 10/2009 | Cen et al. |
| 7,659,894 B2 | 2/2010 | Keller et al. |
| 7,710,988 B1 | 5/2010 | Tripathi et al. |
| 7,720,055 B2 | 5/2010 | Kadambi et al. |
| 7,849,315 B2 | 12/2010 | Hardy et al. |
| 7,886,150 B2 | 2/2011 | Stollon et al. |
| 8,127,350 B2 | 2/2012 | Wei et al. |
| 8,140,759 B2 | 3/2012 | Frey et al. |
| 2002/0029214 A1 | 3/2002 | Yianilos et al. |
| 2002/0165985 A1 | 11/2002 | Chen et al. |
| 2003/0033276 A1 | 2/2003 | Cheng et al. |
| 2003/0115417 A1 | 6/2003 | Corrigan |
| 2003/0123468 A1 | 7/2003 | Nong |
| 2004/0255209 A1 | 12/2004 | Gross |
| 2005/0027920 A1 | 2/2005 | Fitzsimmons et al. |
| 2005/0152352 A1 | 7/2005 | Jun et al. |
| 2006/0029079 A1 | 2/2006 | Cohen et al. |
| 2006/0256783 A1 | 11/2006 | Ayrapetian et al. |
| 2007/0011396 A1 | 1/2007 | Singh et al. |
| 2007/0016756 A1 | 1/2007 | Hsieh et al. |
| 2007/0043856 A1 | 2/2007 | Morris et al. |
| 2007/0226798 A1 | 9/2007 | Sibert |
| 2007/0271374 A1 | 11/2007 | Shomura et al. |
| 2008/0077928 A1 | 3/2008 | Matsuzaki et al. |
| 2008/0092092 A1 | 4/2008 | Dalton et al. |
| 2008/0162793 A1 | 7/2008 | Chu et al. |
| 2008/0239992 A1 | 10/2008 | Krasnyanskiy |
| 2008/0240103 A1 | 10/2008 | Schmidt |
| 2009/0019270 A1 | 1/2009 | Halter et al. |
| 2009/0271562 A1 | 10/2009 | Sinclair |
| 2010/0260198 A1 | 10/2010 | Rojas-Cessa et al. |
| 2011/0219195 A1 | 9/2011 | Habusha et al. |

OTHER PUBLICATIONS

Alan H. Karp and Rajiv Gupta, "Hardware Assist for Data Merging for Shared Memory Multiprocessors", Hewlett Packard Labs, Palo Alto, CA, Mar. 13, 1994.

Sundaram, Chandra, Goyal, Shenoy, Sahni, Vin. "Application Performance in the QLinux Multimedia Operating System", ACM Multimedia, Los Angeles, CA (2000).

Lu, Sheng, Dinda. "Size-based Scheduling Policies with Inaccurate Scheduling Information", Proceedings of the IEEE Computer Society's 12th Annual International Symposium on Modeling, Analysis, and Simulation of Computer and Telecommunications Systems (2004).

Schurgers, Raghunathan, Srivastava. "Modulation Scaling for Real-time Energy Aware Packet Scheduling", IEEE, Nov. 2001.

\* cited by examiner

SHARING OF INTERNAL PIPELINE RESOURCES OF A NETWORK PROCESSOR WITH EXTERNAL DEVICES

CROSS-REFERENCE TO RELATED APPLICATIONS

This application claims the benefit of the filing date of U.S. provisional application No. 61/580,183, filed on Dec. 23, 2011, the teachings of which are incorporated herein by reference.

This application is a continuation-in-part, and claims the benefit of the filing date, of U.S. patent application Ser. No. 12/782,379 filed May 18, 2010, Ser. No. 12/782,393 filed May 18, 2010, now issued as U.S. Pat. No. 8,255,644, and Ser. No. 12/782,411 filed May 18, 2010, now issued as U.S. Pat. No. 8,407,707, the teachings of which are incorporated herein in their entireties by reference.

The subject matter of this application is related to U.S. patent application Ser. No. 12/430,438 filed Apr. 27, 2009, now issued as U.S. Pat. No. 8,352,669, Ser. No. 12/729,226 filed Mar. 22, 2010, Ser. No. 12/729,231 filed Mar. 22, 2010, now issued as U.S. Pat. No. 8,473,657, Ser. No. 12/963,895 filed Dec. 9, 2010, now issued as U.S. Pat. No. 8,499,137, Ser. No. 12/971,742 filed Dec. 17, 2010, Ser. No. 12/974,477 filed Dec. 21, 2010, Ser. No. 12/975,823 filed Dec. 22, 2010, now issued as U.S. Pat. No. 8,505,013, Ser. No. 12/975,880 filed Dec. 22, 2010, now issued as U.S. Pat. No. 8,514,874, Ser. No. 12/976,045 filed Dec. 22, 2010, Ser. No. 12/976,228 filed Dec. 22, 2010, Ser. No. 12/979,551 filed Dec. 28, 2010, now issued as U.S. Pat. No. 8,489,791, Ser. No. 12/979,665 filed Dec. 28, 2010, now issued as U.S. Pat. No. 8,489,792, Ser. No. 12/979,800 filed Dec. 28, 2010, now issued as U.S. Pat. No. 8,489,794, Ser. No. 13/046,717 filed Mar. 12, 2011, Ser. No. 13/046,719 filed Mar. 12, 2011, now issued as U.S. Pat. No. 8,321,385, Ser. No. 13/046,726 filed Mar. 12, 2011, Ser. No. 13/192,104 filed Jul. 27, 2011, Ser. No. 13/192,140 filed Jul. 27, 2011, Ser. No. 13/192,187 filed Jul. 27, 2011, Ser. No. 13/232,422 filed Sep. 14, 2011, Ser. No. 13/250,898 filed Sep. 30, 2011, Ser. No. 13/274,726 filed Oct. 17, 2011, Ser. No. 13/310,961 filed Dec. 5, 2011, Ser. No. 13/316,145 filed Dec. 9, 2011, Ser. No. 13/359,690 filed Jan. 27, 2012, Ser. No. 13/405,053 filed Feb. 23, 2012, Ser. No. 13/403,468 filed Feb. 23, 2012, Ser. No. 13/409,432 filed Mar. 1, 2012, Ser. No. 13/474,114 filed May 17, 2012, Ser. No. 13/480,623 filed May 25, 2012, the teachings of all of which are incorporated herein in their entireties by reference.

BACKGROUND

Network processors are generally used for analyzing and processing packet data for routing and switching packets in a variety of applications, such as network surveillance, video transmission, protocol conversion, voice processing, and internet traffic routing. Early types of network processors were based on software-based approaches with general-purpose processors, either singly or in a multicore implementation, but such software-based approaches are slow. Further, increasing the number of general-purpose processors had diminishing performance improvements, or might actually slow down overall Network Processor throughput. Newer designs add hardware accelerators to offload certain tasks from the general-purpose processors, such as encryption/decryption, packet data inspections, etc. These newer Network Processor designs are traditionally implemented with either i) a non-pipelined architecture or ii) a fixed pipeline architecture.

In a typical non-pipelined architecture, general-purpose processors are responsible (breach action taken by acceleration functions. A non-pipelined architecture provides great flexibility in that the general-purpose processors can make decisions on a dynamic, packet-by-packet basis, thus providing data packets only to the accelerators or other processors that are required to process each packet. However, significant software overhead is involved in those cases where multiple accelerator actions might occur in sequence.

In a typical fixed-pipeline architecture, packet data flows through the general-purpose processors and/or accelerators in a fixed sequence regardless of whether a particular processor or accelerator is required to process a given packet. Use of this fixed sequence might add significant overhead to packet processing and has limited flexibility to handle new protocols, thereby limiting the advantage provided by using accelerators in an architecture.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide a system having at least two network processors that each have a plurality of processing modules. The processing modules process a packet in a task pipeline by transmitting task messages to other processing modules on a task ring, the task messages related to desired processing of the packet. A series of tasks within a network processor may result in no processing or reduced processing for certain processing modules creating a virtual pipeline depending on the packet received by the network processor. At least two of the network processors communicate tasks. This communication allows for the extension of the virtual pipeline of one network processor to at least two network processors.

BRIEF DESCRIPTION OF THE DRAWING FIGURES

Other aspects, features, and advantages of the present invention will become more fully apparent from the following detailed description, the appended claims, and the accompanying drawings in which like reference numerals identify similar or identical elements.

DETAILED DESCRIPTION in accordance with exemplary embodiments, a system is provided having at least two network processors that each have a plurality of processing modules. The processing modules process a packet in a task pipeline by transmitting task messages to other processing modules on a task ring for how to process the packet. A series of tasks within a network processor may result in no processing or reduced processing for certain processing modules creating a virtual pipeline depending on the packet received by the network processor. At least two of the network processors communicate tasks. This communication allows for the extension of the virtual pipeline of one network processor to at least two network processors.

Table 1 summarizes a list of acronyms employed throughout this specification as an aid to understanding the described embodiments of the invention:

TABLE 1

| | | | |
|---|---|---|---|
| USB | Universal Serial Bus | FIFO | First-In, First-Out |
| SATA | Serial Advanced Technology Attachment | I/O | Input/Output |
| SCSI | Small Computer System Interface | DDR | Double Data Rate |
| SAS | Serial Attached SCSI | DRAM | Dynamic Random Access Memory |
| PCI-E | Peripheral Component Interconnect Express | MPLS | Multi-Protocol Label Switching |
| SRIO | Serial RapidIO | CRC | Cyclic Redundancy Check |
| SoC | System-on-Chip | µP | Microprocessor |
| MMB | Memory Manager Block | MPP | Modular Packet Processor |
| PAB | Packet Assembly Block | MTM | Modular Traffic Manager |
| SPP | Security Protocol Processor | SED | Stream Editor |
| VLAN | Virtual Local Area Network | OSI | Open Systems Interconnection |
| UDP | User Datagram Protocol | ACL | Access Control List |
| TCP | Transmission Control Protocol | IP | Internet Protocol |

Figure 1:
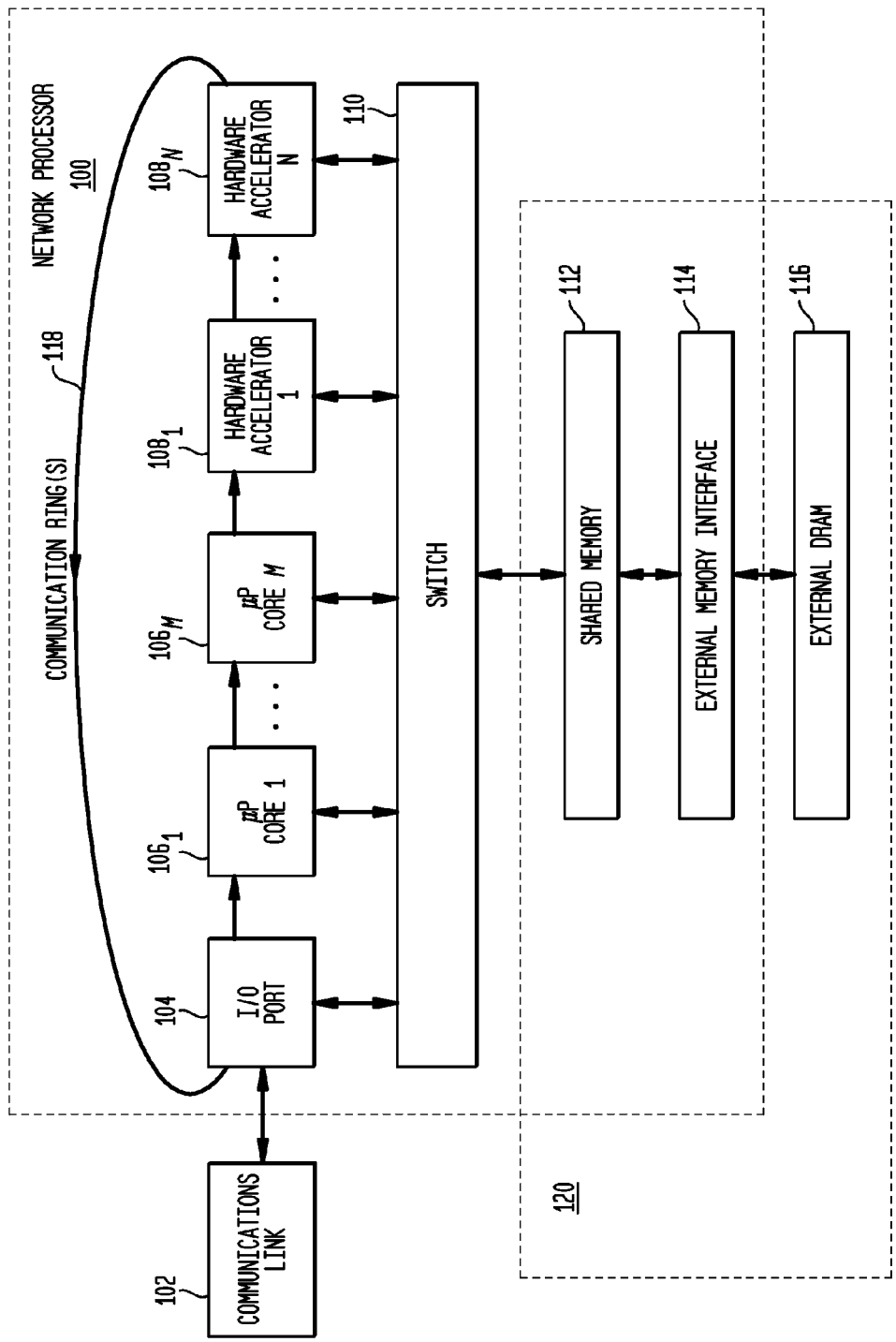
FIG. 1 shows a block diagram of a network processor in accordance with exemplary embodiments.

FIG. 1 shows a block diagram of an exemplary network processor system (network processor 100) implemented as a system-on-chip (SoC). Network processor 100 might be used for processing data packets, performing protocol conversion, encrypting and decrypting data packets, or the like. As shown in FIG. 1, network processor 100 includes on-chip shared memory 112, one or more input-output (I/O) interfaces collectively shown as I/O port 104, one or more microprocessor (µP) cores $106_1$-$106_M$, and one or more hardware accelerators $108_1$-$108_N$, where M and N are integers greater than or equal to 1. Network processor 100 also includes external memory interface 114 for communication with external memory 116. External memory 116 might typically be implemented as a dynamic random-access memory (DRAM), such as a double-data-rate three (DDR-3) DRAM, for off-chip storage of data. In some embodiments, such as shown in FIG. 1, each of the one or more I/O interfaces, µP cores and hardware accelerators might be coupled through switch 110 to shared memory 112, Switch 110 might be implemented as a non-blocking crossbar switch such as described in related U.S. patent application Ser. No. 12/430,438 filed Apr. 27, 2009, Ser. No. 12/729,226 filed Mar. 22, 2010, and Ser. No. 12/729,231 filed Mar. 22, 2010, which are incorporated by reference herein.

I/O port 104 might typically be implemented as hardware that connects network processor 100 to one or more external devices through I/O communication link 102. I/O communication link 102 might generally be employed for communication with one or more external devices, such as a computer system or networking device, which interfaces with network processor 100. I/O communication link 102 might be a custom-designed communication link, or might conform to a standard communication protocol such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, a Peripheral Component Interconnect Express ("PCI-E") link, a Serial Rapid I/O ("SRIO") link, or any other interlace link. Received packets are preferably placed in a buffer in shared memory 112 by transfer between I/O port 104 and shared memory 112 through switch 110.

In embodiments of the present invention, shared memory 112 is a conventional memory operating as a cache that might be allocated and/or subdivided. For example, shared memory 112 might include one or more FIFO queues that might be dynamically allocated to the various µP cores 106 and hardware accelerators 108. External memory interface 114 couples shared memory 112 to one or more external memories, shown as external memory 116, to provide off-chip storage of data not currently in use by the various µP cores 106 and hardware accelerators 108 to free space in shared memory 112. As indicated by the dashed line, shared memory 112 and external memory 116 might generally be referred to as system memory 120.

Hardware accelerators 108 might interact with each other, for example, by one or more communication (e.g., bus) rings 118 that pass "tasks" from a source core to a destination core. As described herein, tasks are instructions to the destination core to perform certain functions, and a task might contain address pointers to data stored in shared memory 112, as described in related U.S. patent application Ser. Nos. 12/782,379, 12/782,393, and 12/782,411, all filed May 18, 2010, the teachings of which are incorporated in their entireties by reference herein.

Network processor 100 might typically receive data packets from one or more source devices, perform processing operations for the received data packets, and transmit data packets out to one or more destination devices. As shown in FIG. 1, one or more data packets are transmitted from a transmitting device (not shown) to network processor 100, via communications link 102. Network processor 100 might receive data packets from one or more active data streams concurrently from communications link 102. I/O port 104 might parse the received data packet and provide the received data packet, via switch 110, to a buffer in shared memory 112.

I/O port 104 provides various types of I/O interface functions and, in exemplary embodiments described herein, is a command-driven hardware accelerator that connects network processor 100 to external devices. Received packets are preferably placed in shared memory 112 and then one or more corresponding tasks are generated. Transmitted packets are preferably generated from data in shared memory 112 for one or more corresponding tasks and might be transmitted out of network processor 100. Exemplary I/O interfaces include Ethernet 110 adapters providing integrity checks of incoming data. The I/O interfaces might also provide timestamp data for received and transmitted packets that might be used to implement features such as timing over packet (e.g., specified in the standard recommendations of IEEE 1588). In alternative embodiments, I/O port 104 might be implemented as input (receive) only or output (transmit) only interfaces.

Figure 3:
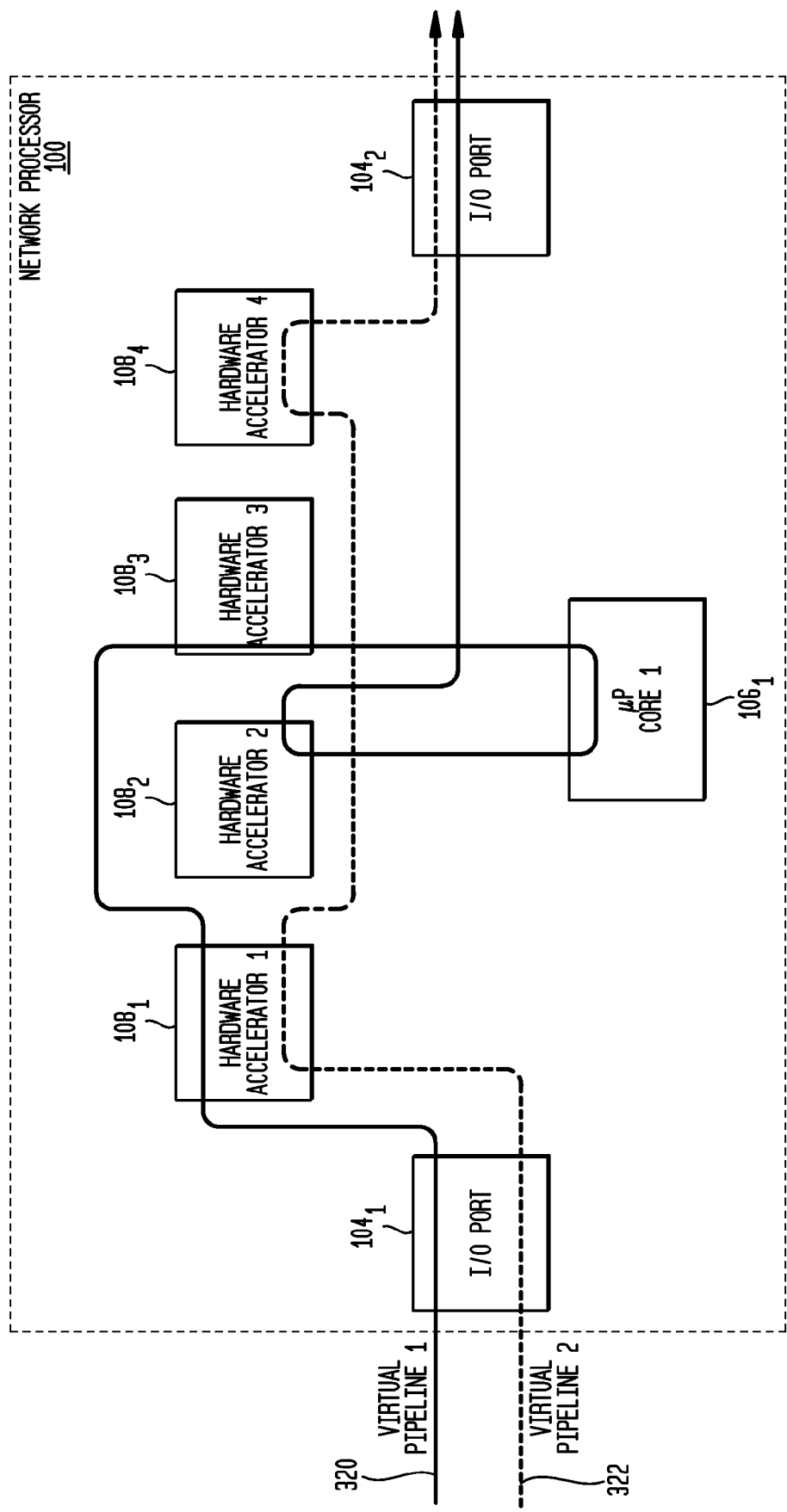
FIG. 3 shows an exemplary logical diagram of packets flowing through exemplary "virtual pipelines" of the network processor of FIG. 1.

As described in greater detail in regard to FIG. 3, the sequence of processing of the tasks depends on i) the type of packet and ii) the type of processing performed by the various cores on a particular packet (or group of packets), control message, or other data. This is referred to herein as a "Virtual Pipeline™", a trademark of LSI Corporation, of Milpitas, Calif. In described embodiments each of a plurality of virtual pipelines operate by each processing module of network processor 100 receiving a task, executing that task, and assigning a subsequent task to another (or the same) processing module depending on an identification of a virtual pipeline corresponding to the task. As described herein, tasks are instructions to the destination core to perform certain functions, and a task might be passed substantially as described in related U.S. patent application Ser. Nos. 12/782,379, 12/782,393, and 12/782,411, all filed May 18, 2010, the teachings of which are incorporated in their entireties by reference herein.

The various µP cores 106 and hardware accelerators 108 of network processor 100 might include several exemplary types of processors or accelerators. For example, the various µP cores 106 might be implemented as Pentium®, Power PC® or ARM processors or a combination of different processor types (Pentium® is a registered trademark of Intel Corporation, ARM processors are by ARM Holdings, plc, and Power PC® is a registered trademark of IBM). The various hardware accelerators 108 might include, for example, one or more function-specific modules, such as a Modular Packet Processor (MPP), a Packet Assembly Block (PAB), a Modular Traffic Manager (MTM), a Memory Management Block (MMB), a Stream Editor (SED), a Security Protocol Processor (SPP), a Regular Expression (RegEx) engine, and other special-purpose modules.

The MTM a software-driven accelerator that provides packet scheduling and possibly up to six levels of scheduling hierarchy. The MTM might support millions of queues and schedulers (enabling per flow queuing if desired). The MTM might provide support for shaping and scheduling with smooth deficit weighed round robin (SDWRR) for every queue and scheduler. The MTM might also support multicasting. Each copy of a packet is scheduled independently and traverses down one or more virtual pipelines enabling multicast with independent encapsulations or any other processing. The MTM also contain a special purpose processor that can be used for fine-grained control of scheduling decisions. The MTM might be used to make discard decisions as well as scheduling and shaping decisions. The MTM might operate substantially as described in related U.S. patent application Ser. No. 13/232,422, filed Sep. 14, 2011 and Ser. No. 13/250,898 filed Sep. 30, 2011, the teachings of which are incorporated in their entireties by reference herein.

The SED is a software-driven accelerator that allows for editing of packets. The SED performs packet editing functions that might include adding and modifying packet headers as well as fragmenting or segmenting data (e.g., IP fragmentation). The SED receives packet data as well as parameters from tasks and a task specified per-flow state. The output of the SED can become the outgoing packet data and can also update task parameters.

The RegEx engine is a packet search engine for state-based cross-packet pattern matching. The RegEx engine is multi-threaded accelerator. An exemplary RegEx engine might be implemented such as described in U.S. Pat. No. 7,430,652 to Hundley, U.S. Pat. No. 7,899,904 to Ruehle and U.S. Pat. No. 7,512,592 to Lemoine, the teachings of which are incorporated in their entireties by reference herein.

The SPP provides encryption/decryption capabilities and is a command-driven hardware accelerator, preferably having the flexibility to handle protocol variability and changing standards with the ability to add security protocols with firmware upgrades. The ciphers and integrity (hash) functions might be implemented in hardware. The SPP has a multiple ordered task queue mechanism, discussed in more detail below, that is employed for load balancing across the threads.

The MMB allocates and frees memory resources in shared memory 112. Memory is allocated for such applications as task FIFO storage, packet data storage, hash-table collision handling, timer event management, and traffic manager queues. The MMB provides reference counts to each block of memory within shared memory 112. Multiple reference counts allow for more efficient storage of information, such as multicast traffic (data to be sent to multiple destinations) or for retransmission. Multiple reference counts remove a need for replicating data each time the data is needed. The MMB preferably tracks the memory allocations using a stack-based approach since a memory block recently released is preferably the next block to be allocated for a particular task, reducing cache thrashing and cache tracking overhead. Blocks in shared memory 112 might be dynamically allocated by the MMB to store data, with the blocks in one of the following sizes: 256, 2048, 16384, and 65536 bytes. The MMB might operate substantially as described in related U.S. patent application Ser. No. 12/963,895 filed Dec. 9, 2010 and Ser. No. 13/359,690 filed Jan. 27, 2012, the teachings of which are incorporated in their entireties by reference herein.

The PAB is a command driven hardware aceelerator providing a holding buffer with packet assembly, transmit, retransmit, and delete capabilities. An incoming task to the PAB can specify to insert/extract data from anywhere in any assembly buffer. Gaps are supported in any buffer. Locations to insert and extract can be specified to the bit level. Exemplary traditional packet reassembly functions might be supported, such as IP defragmentation. The PAB might also support generalized holding buffer and sliding window protocol transmit/retransmit buffering, providing an offload for features like TCP origination, termination, and normalization. The PAB might operate substantially as described in related U.S. patent application Ser. No. 12/971,742 filed Dec. 17, 2010, and Ser. No. 13/405,053 filed Feb. 23, 2012, the teachings of which are incorporated in their entireties by reference herein.

The MPP is a multi-threaded special purpose processor that provides tree based longest prefix and access control list classification. The MPP also has a hardware hash-based classification capability with full hardware management of hash-table additions, deletions, and collisions. Optionally associated with each hash entry is a timer that might be used under software control for tasks such as connection timeout and retransmission timing. The MPP contains a statistics and state management engine, which when combined with the hash table and timer facilities, provides support for state-based protocol processing. The MPP might support millions of flows, limited only by the amount of DRAM capacity assigned to the functions. The MPP architecture might be able to store all per thread states in memory instead of in register files. The MPP might operate substantially as described in related U.S. patent application Ser. No. 12/974,477 filed Dec. 21, 2010, and U.S. patent application Ser. Nos. 12/975,823, 12/975,880, 12/976,045, and 12/976,228 all filed Dec. 22, 2010, which are incorporated in their entireties by reference herein. The MPP might also include hash functionality such as described in related U.S. patent application Ser. Nos. 13/046,717, 13/046,719, and 13/046,726 all filed Mar. 12, 2011 and Ser. No. 13/403,468 filed Feb. 23, 2012, the teachings of which are incorporated in their entireties by reference herein.

Thus, tasks are employed by network processor 100 to enable one or more "virtual pipelines" in order to determine the order of processing by the various μP cores 106 and hardware accelerators 108 of network processor 100. Thus, network processor 100 processes data and control messages more efficiently than a fixed pipeline or non-pipelined architecture. As described herein, the "virtual pipeline" of network processor 100 employs metadata associated with the packet to determine the order of processing by corresponding, ones of cores 106 and hardware accelerators 108.

Figure 2:
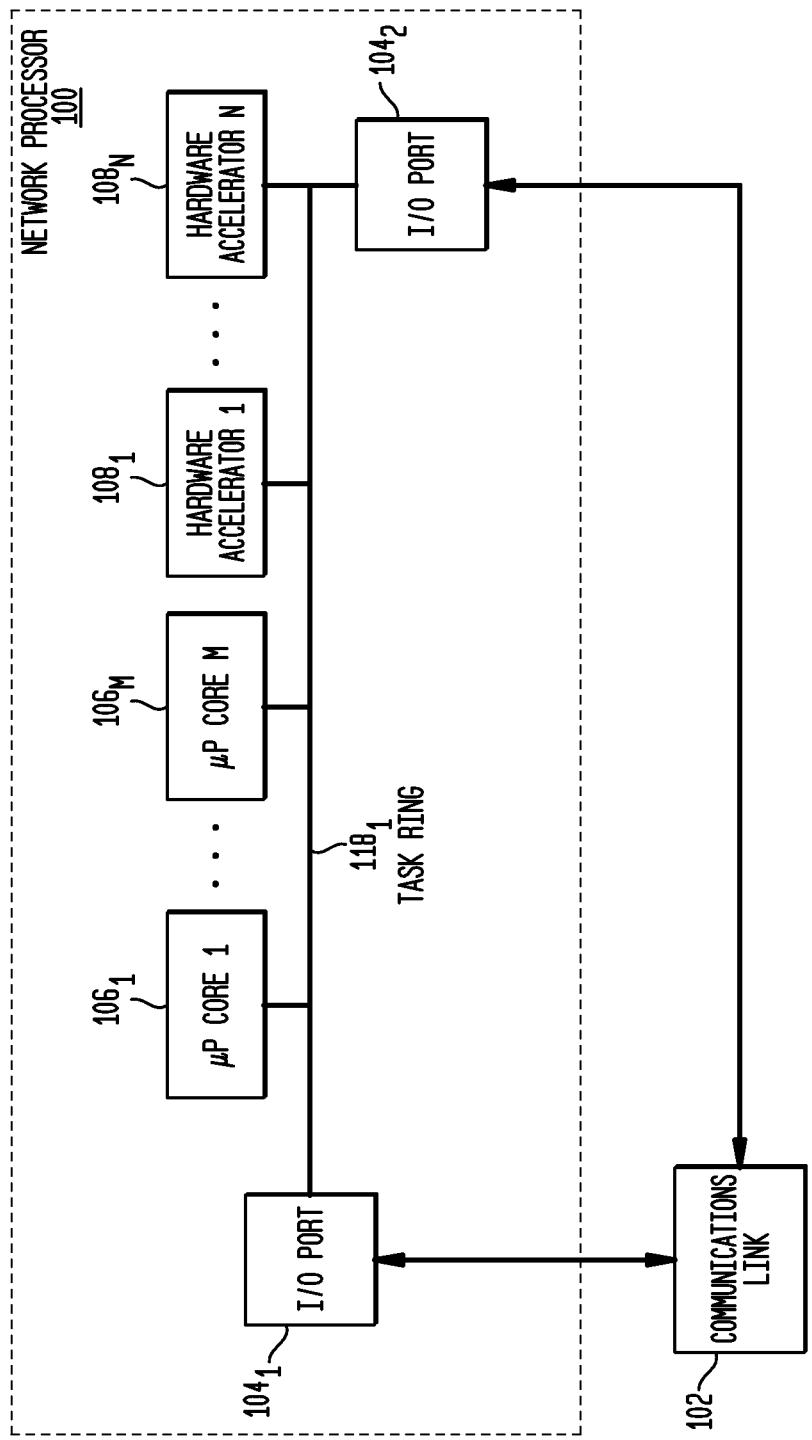
FIG. 2 shows a block diagram of a task ring employed by the network processor of FIG. 1 in accordance with exemplary embodiments.

FIG. 2 shows a block diagram of an embodiment of network processor 100. As shown in FIG. 2, packets are received by a first I/O port $104_1$, which parses the received packet and generates one or more tasks corresponding to the received packet. The tasks are sent on task ring $118_1$ to corresponding μP cores 106 and hardware accelerators 108. The corresponding μP cores 106 and hardware accelerators 108 process packet data based on the tasks, and provide corresponding tasks to a second I/O port $104_2$. Second I/O port $104_2$ generates an output packet corresponding to the received and processed tasks, and provides the output pocket(s) to I/O communication link(s) 102.

FIG. 3 shows an exemplary packet flow of two exemplary virtual pipelines of network processor 100. FIG. 3 shows a first virtual pipeline sequence 320 for processing an exemplary packet, and as second virtual pipeline sequence 322 for processing another exemplary packet. As shown in FIG. 3, virtual pipeline 320 defines a processing order starting at I/O port $104_1$, proceeding through hardware accelerator $108_1$, hardware accelerator $108_3$, μP core $106_1$, hardware accelerator $108_2$, and finishing, at I/O port $104_2$. However, another packet received by the first I/O port $104_1$ might be processed in accordance with second virtual pipeline 322. As shown in FIG. 3, virtual pipeline 322 also defines as processing order starting at I/O port $104_1$ and proceeding through hardware accelerator $108_1$ but then proceeding to hardware accelerator $108_4$ and then finishing at I/O port $104_2$. Processor core $106_1$ and hardware accelerator cores $108_2$ and $108_3$ are not included in virtual pipeline 322.

Because only those cores that are required are included in a virtual pipeline, network processor 100 has increased efficiency of processing data packets. Each core includes template tables describing the task parameters and task format for processing by the next core for each task on a given virtual pipeline, and which task parameters are consumed by the current core. In some embodiments, hardware accelerator care $108_1$ might be a packet classifier (e.g., the MPP) that parses incoming packet and determines what virtual pipeline tasks are to follow for a given packet. Hardware accelerator core $108_2$ might be a scheduler (e.g., the MTM) that transmits outgoing packets according to configured schedule parameters. Hardware accelerator core $108_3$ might be a decryption engine (e.g. the SPP) that decrypts packet prior to sending it to processor core $106_1$. Hardware accelerator core $108_4$ might be a packet data modifier (e.g., the SED) that updates packet data before sending it out via I/O Port $104_2$.

Figure 4:
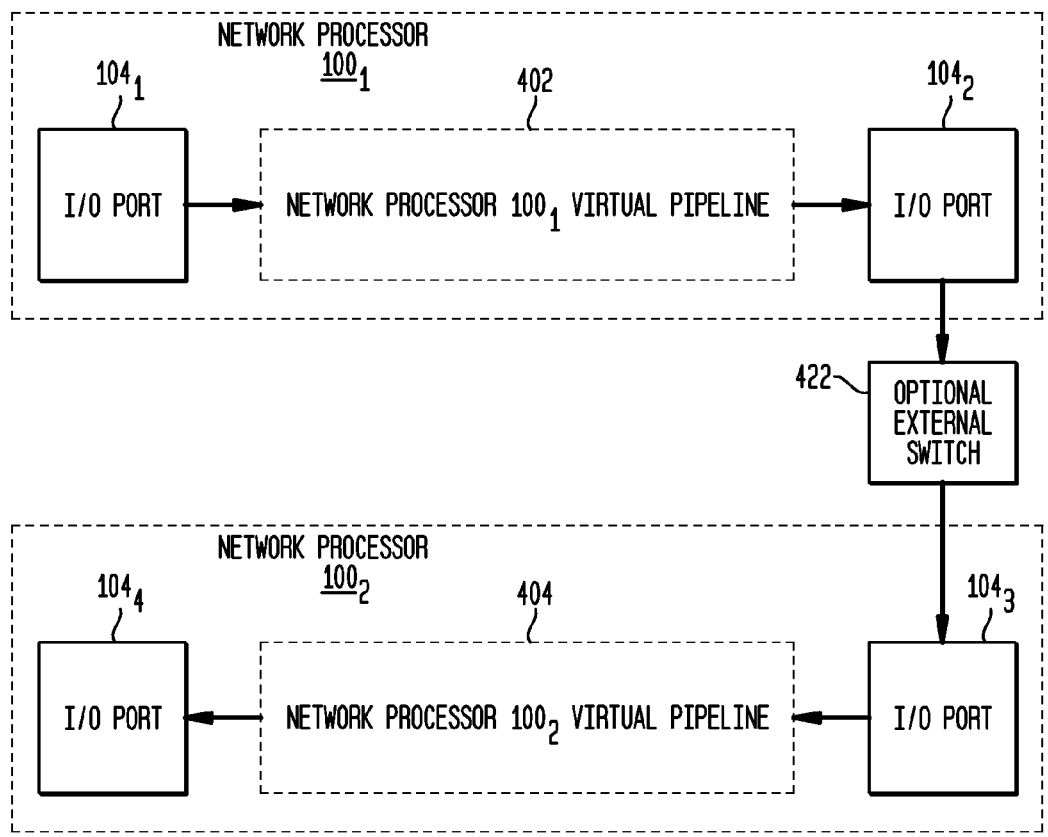
FIG. 4 shows an exemplary block diagram of multiple network processors of FIG. 1 in communication to share resources in accordance with exemplary embodiments.

In order to support higher bandwidth applications, network processor 100 might share resources such as the various μP cores 106 and hardware accelerators 108 between multiple network processors, such as shown in FIG. 4. FIG. 4 shows a block diagram of described embodiments that connects multiple network processors $100_1$ and $100_2$ into a single logical system 400. System 400 enables virtual pipeline 402 of network processor $100_1$ to be extended to and shared by one or more additional network processors (e.g., network processor $100_3$). For example, a packet might arrive at network processor $100_1$ at I/O port $104_1$ and, be partially processed by virtual pipeline 402. Then the partially processed packet and a task message might be sent out of network processor $100_3$ through I/O port $104_2$ to network processor $100_2$ arriving I/O port $104_3$. Alternatively, the packet and task message might be sent through optional external switch 422 before arriving at network processor $100_2$. Virtual pipeline 404 of network processor $100_2$ processes the partially processed packet and task message received from network processor $100_1$. The packet could be sent out of network processor $100_2$ through I/O port $104_4$ to another destination which may perform additional processing if an additional task message is also sent.

Task messages may be sent separately from the packet or task messages may be inserted as data within the packet. Described embodiments may insert data in the packet before it is sent from first network processor $100_1$ and extract that data by subsequent network processor $100_2$ for use as task parameters to enable sharing between virtual pipelines 402 and 404. This reduces the need for classification of the packet in the subsequent network processor $100_2$. Although shown in FIG. 4 as only having two network processors, any number of subsequent network processors might be coupled together. The ability to couple multiple network processors 100 and share virtual pipelines between them allows processing to be split between two or more network processors 100. For example, the first network processor $100_1$ might classify the packet and the second network processor $100_2$ might schedule the packet. For packets flowing in the opposite direction, the roles of the network processors 100 might be reversed, in essence allowing for double the bandwidth of a single network processor.

Figure 5:
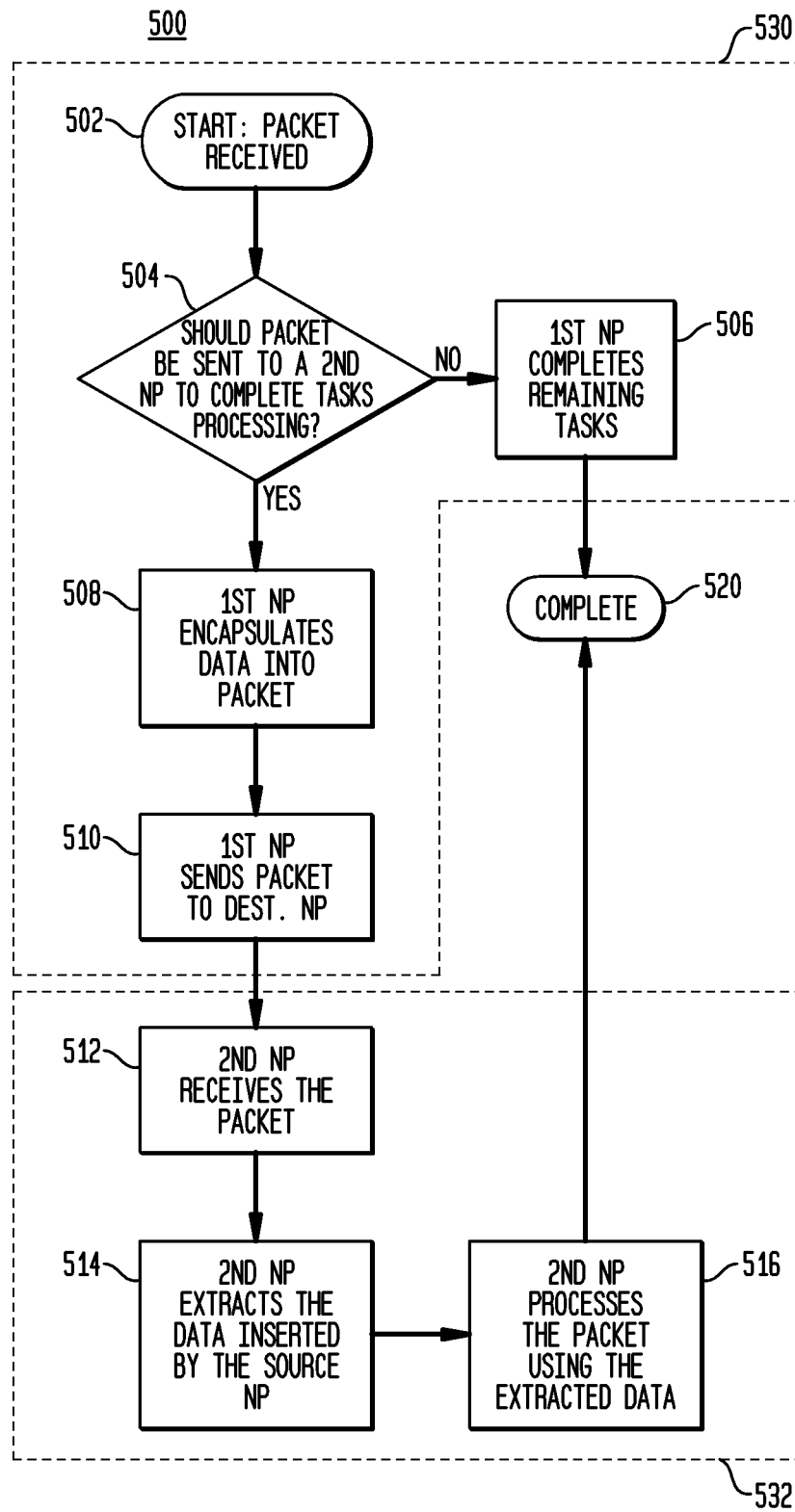
FIG. 5 shows an exemplary flow diagram of a process of resource sharing of the system of FIG. 4.

FIG. 5 shows a flow diagram of process 500 for sharing tasks between network processors $100_1$ and $100_2$. Steps occurring within network processor $100_1$ are shown as occurring within dashed line 530. Steps occurring within the network processor $100_2$ are shown as occurring, within dashed line 532. At step 502, a packet is received by network processor $100_1$, and the packet data might be operated on by various processing modules (e.g., 106 or 108) corresponding to a given virtual pipeline of network processor $100_1$. At step 504, network processor $100_1$ determines whether the packet should be sent to a network processor $100_2$ for further processing. For example, one or more tasks corresponding to the packet might be provided to virtual pipeline 404 of network processor $100_2$ to complete processing of the packet, if, at step 504, source network processor $100_1$ determines that the packet does not require another network processor to complete processing, then task processing for the packet is completed by network processor $100_1$ at stop 506. Processing of the packet might complete at step 520, for example, by sending the processed packet as an output packet of network processor $100_1$.

If, at step 504, network processor $100_1$ determines that the packet should be seat to network processor $100_2$, then, at step 508, network processor $100_1$ adds data to (or otherwise augments with data) the packet, for example, by inserting data into an existing packet. At step 510, network processor $100_1$ sends the packet to network processor $100_2$. The inserted data is used by network processor $100_2$ as instructions for further task processing. At step 512, network processor $100_2$ receives the packet with the inserted data. At step 514, network processor $100_2$ extracts the inserted data. At step 516, network processor 100₂ processes the packet using the task instructions from the extracted data, and the task processing for the packet completes at step 520.

Figure 6:
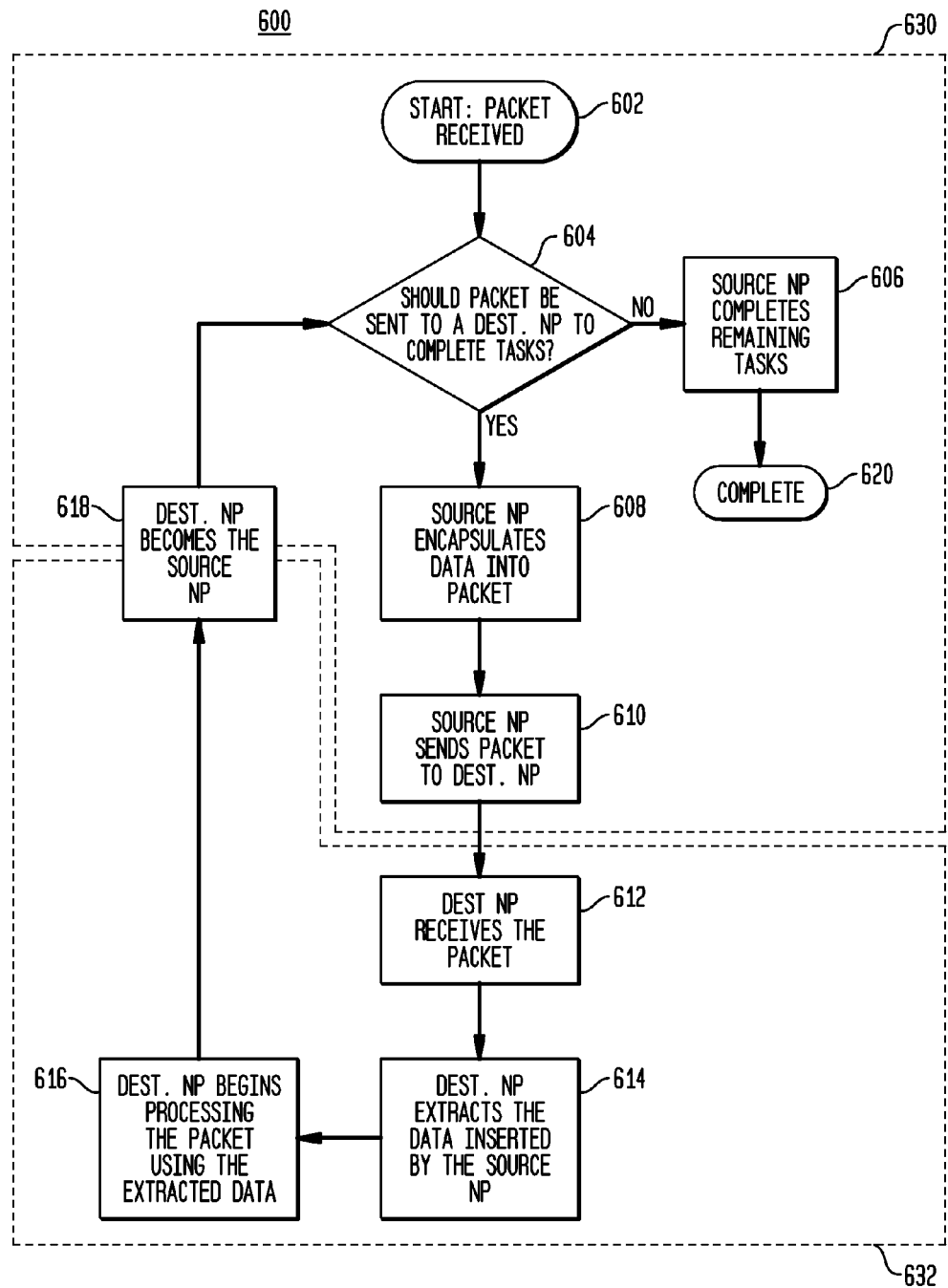
FIG. 6 shows an exemplary flow diagram of a source network processor sending a packet for further task processing to one or more destination network processors in the system of FIG. 4.

In the following discussion, the "s" in network processor 100ₛ refers to "source" network processor, and the "d" in network processor 100_d refers to "destination" network processor. FIG. 6 shows a flow diagram of process 600 for sharing tasks between source network processors 100ₛ and destination network processors 100_d. Steps occurring within source network processor 100_d are shown as occurring within dashed line 630. Steps occurring within destination network processor 100_d are shown as occurring within dashed line 632. Process 600 is a variation of process 500. Process 600 provides a loop for allowing each destination processor 100_d to send received packets to other destination processors. At step 602, a packet is received by source network processor 100ₛ, and the packet data might be operated on by various processing modules (e.g., 106 or 108) corresponding to a given virtual pipeline of source network processor 100ₛ. At step 604, source network processor 100ₛ determines whether the packet should be sent to a destination network processor 100_d for further processing.

If, at step 604, source network processor 100ₛ determines that the packet does not require another network processor to complete processing, then task processing for the packet is completed by source network processor 100ₛ at step 606. Processing of the packet might complete at step 620, for example, by sending the processed packet as an output packet of source network processor 100ₛ. If, at step 604, source network processor 100ₛ determines that the packet should be sent to a destination network processor 100_d, then, at step 608, source network processor 100ₛ inserts data into (or otherwise augments with data) the packet. At step 610, source network processor 100ₛ sends the packet to destination network processor 100_d. The inserted data is used by destination network processor 100_d as instructions for further task processing. At step 612, destination network processor 100_d receives the packet with the inserted data. At step 614, destination network processor 100_d extracts the inserted data. At step 616, destination network processor 100_d processes the packet using the task instructions from the extracted data.

At step 618, destination network processor 100_d acts as a source network processor. After step 618, process 600 returns to step 604, where, a source network processor determines whether to complete the processing or to send the packet to another destination processor for further processing. When a source network processor determines to complete processing, process 600 proceeds to step 606 where the remaining tasks are completed, and the processing of the packet completes at step 620. Processing of the packet completes at step 620, for example, by sending the processed packet as an output packet of source network processor 100ₛ.

Insertion of data by source network processor 100ₛ might use a user-defined Ethertype, allowing the port to receive both VPE (virtual pipeline extension) packets and packets from the outside world. In addition, standard Ethernet switches (e.g., 422 of FIG. 4) might be employed to couple multiple network processors and thus aggregate flows into ports if desired. Further, the ability to "stack" up an arbitrary number of network processors using switches or ports increases the processing bandwidth to an arbitrary size.

Figure 7:
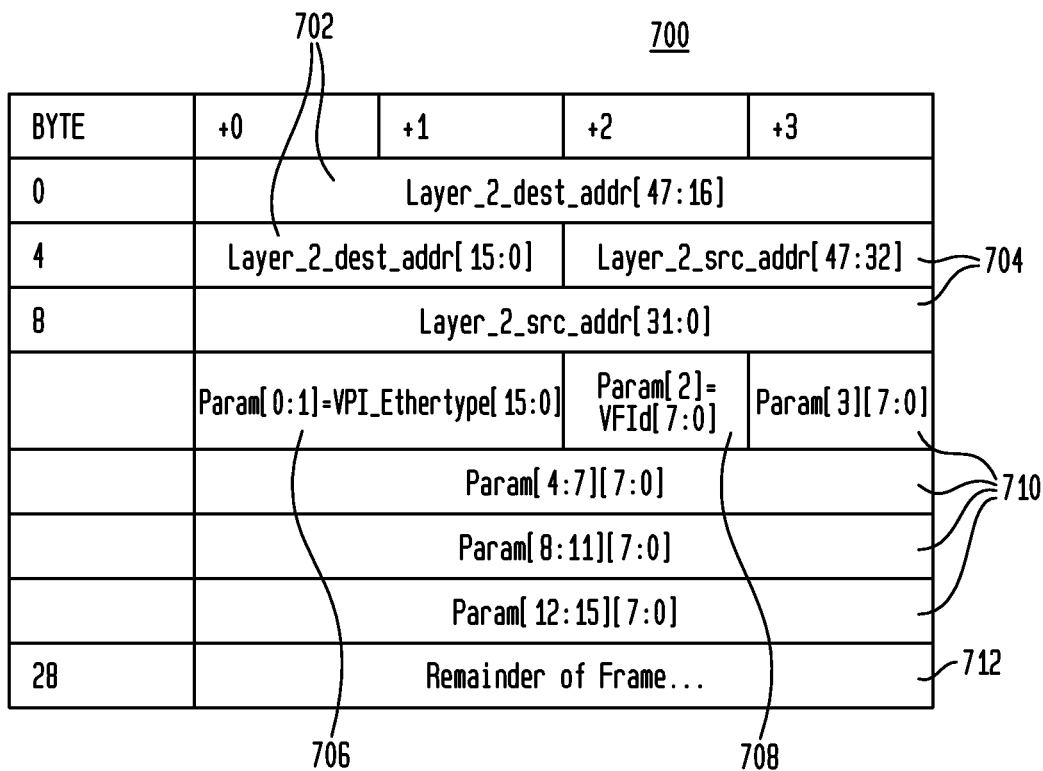
FIG. 7 shows an exemplary table of data included in a packet sent by the source network processor in the system of FIG. 4.

FIG. 7 shows exemplary table 700 showing exemplary data that source network processor 100ₛ might insert into an Ethernet packet before sending the packet to destination network processor 100_d. As shown, packet data might typically include header data such as a destination MAC address 702, a source MAC address 704 and the remainder of the Ethernet frame 712. Source network processor 100ₛ might typically insert or modify data such as Ethertype data 706. Destination network processor 100_d detects the inserted Ethertype data 706, and based on the detected Ethertype data, extracts other inserted data, such as Virtual Flow ID 708, which is used to identify the virtual pipeline for the packet, and task parameters 710, which might be used by destination network processor 100_d to determine task processing of the packet.

In some embodiments, source network processor 100ₛ might insert 16 bytes of data starting at byte 12 of a packet. For example, source network processor 100ₛ might insert 2 bytes of Ethertype data 706, 1 byte of Virtual Flow ID 708 for destination network processor 100_d, and 13 bytes of task parameters 710. Destination network processor 100_d might extract these same 16 bytes when receiving a packet containing them in order to process the received packet. In some embodiments, such a virtual pipeline extension frame might be coquetted to destination network processor 100_d with bytes 12:27 removed from packet data such that queued packets do not store the encapsulated data and, thus, queued packet data is shortened by 16 bytes relative to the length of the received packet. Thus, as described, encapsulated data might be sent between multiple network processors as inline data without requiring a dedicated channel.

Figure 8:
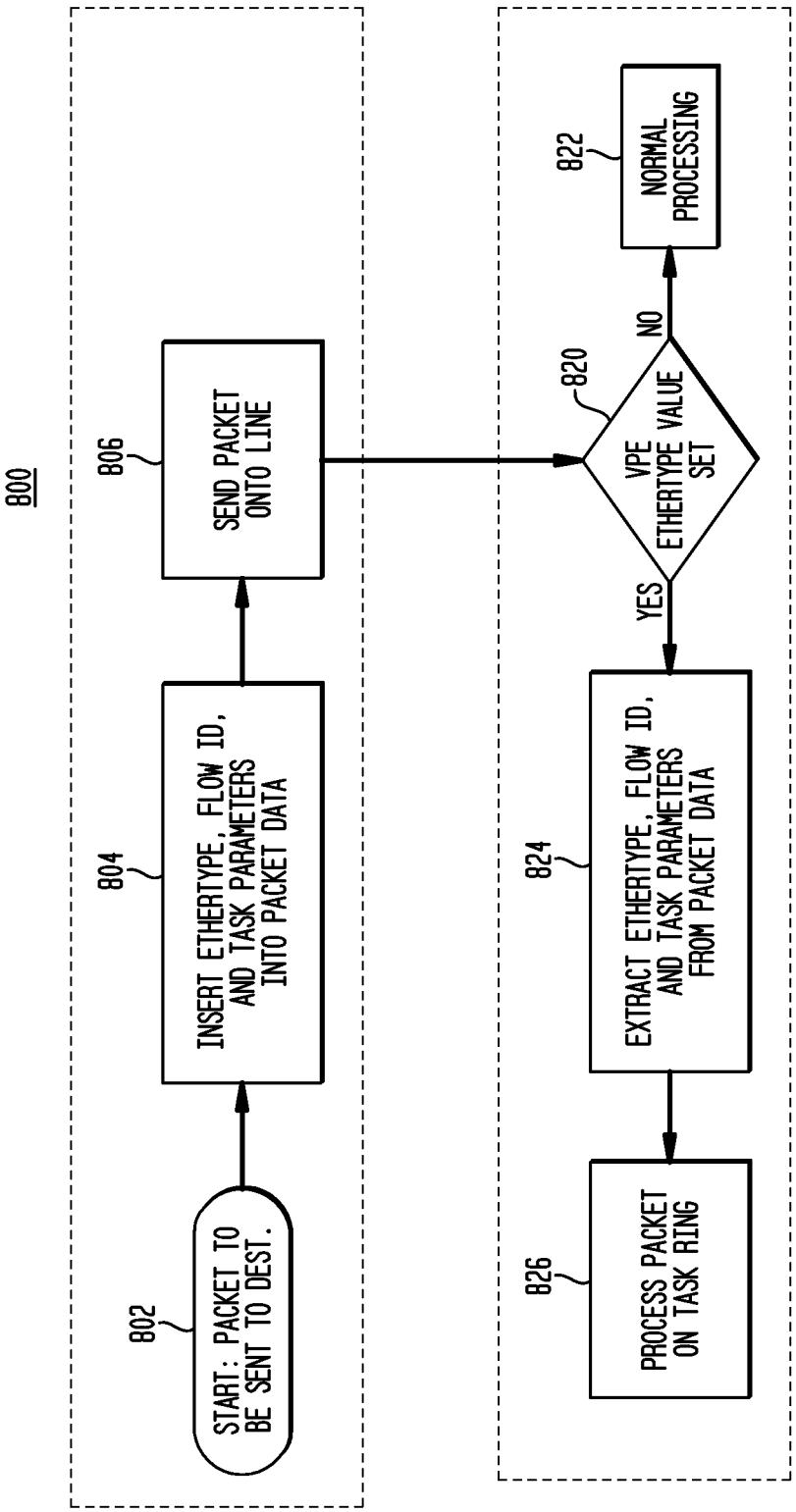
FIG. 8 shows an exemplary flow diagram showing of how a source network processor inserts data into a packet that the destination network processor extracts to do further task processing on the packet.

FIG. 8 shows a flow diagram of process 800 for source network processor 100ₛ and destination network processor 100_d to communicate the data inserted by the source network processor as described in regard to FIG. 5 and FIG. 6. At step 802, source network processor 100ₛ processes a packet and sends the packet to destination network processor 100_d (e.g., as described for steps 504-510 of FIG. 5 and steps 604-610 of FIG. 6). At step 804, 16 bytes are inserted in the packet as described in regard to HU 7. The 16 inserted bytes include, but are not limited to, 2 bytes of Ethertype, 1 byte of virtual flow ID and 13 bytes of task parameters. The insertion of data could be done using, either software running on one of µP cares 106 or by a dedicated hardware accelerator 108 (such as the SED engine described herein). The packet is then sent to destination network processor 100_d at step 806. Destination network processor 100_d receives the packet at step 820 and parses the user defined Ethertype. Destination network processor 100_d will not extract data unless extraction is enabled. If, at step 820, inserted Ethertype data is DOT detected or extraction is not enabled, then destination network processor 100_d continues normal processing of the received packet at step 822. If, at step 820, the destination network processor 100_d detects the inserted Ethertype data and extraction is enabled, then the 16 bytes of inserted data are extracted from the packet at step 824. At step 826, the extracted data forms a task that is then processed by the µP cores 106 and hardware accelerators 108 of destination network processor 100_d based on the corresponding virtual pipeline defined by the virtual flow ID.

Thus, as described herein, embodiments provide a system having at least two network processors that each have a plurality of processing modules. The processing modules process a packet in a task pipeline by transmitting task messages to other processing modules on a task ring for how to process the packet. A series of tasks within a network processor may result in no processing or reduced processing for certain processing modules creating a virtual pipeline depending an the packet received by the network processor. At least two of the network processors communicate tasks. The determination, by a source network processor, on whether to pass a task to a destination network processor could be made by application software running inside the source network processor.

This communication allows for the logical extension of the virtual pipeline of one network processor to at least two network processors.

While the exemplary embodiments of the present invention have been described with respect to processing blocks in a software program, including possible implementation as a digital signal processor, micro-controller, or general-purpose computer, the present invention is not so limited. As would be apparent to one skilled in the art, various functions of software might also be implemented as processes of circuits. Such circuits might be employed in, for example, a single integrated circuit, a multi-chip module, a single card, or a multi-card circuit pack.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the thrill of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

It will be further understood that various changes in the details, materials, and arrangements of the parts that have been described and illustrated in order to explain the nature of this invention might be made by those skilled in the art without departing from the scope of the invention as expressed in the following claims.

We claim:

1. A system comprising
at least two network processors configured to process received data packets, each network processor comprising:
  a plurality of processing modules, wherein corresponding ones of the processing modules are selected to process a received data packet in a task pipeline based on one or more tasks associated with the received data packet, wherein tasks are transmitted to the processing modules on a task ring of the network processor;
  wherein, a first of the at least two network processors is configured to:
    receive a data packet and perform processing on the received data packet based on the one or more associated tasks;
    determine, whether processing of the received data packet should be completed by one or more subsequent ones of the at least two network processors;
    generate a partially processed data packet based on the received packet;
    insert a task message in the partially processed data packet; and
    transmit the partially processed data pocket and the task message to the corresponding one or more subsequent ones of the at least two network processors;
  wherein, the corresponding one or more subsequent ones of the at least two network processors are each configured to:
    receive the partially processed data packet and the task message;
    based on the task message, determine one or more tasks of the partially processed data packet, wherein the task message determines an order of processing of the partially processed data packet by the one or more subsequent ones of the at least two network processors;
    extract the task message from the partially processed data packet; and
    using, by the one or more destination network processors, the extracted task message to further process the partially processed data packet, thereby extending the task ring of the first network processor to the corresponding one or more subsequent ones of the at least two network processors.

2. The system of claim 1, wherein the processing module comprising I/O cores, processor cores, and hardware accelerator cores.

3. The system of claim 1, wherein the one or more subsequent network processor, upon receiving a partially processed data packet and a task message, are configured to:
  determine whether processing of the received partially processed data packet should be completed by one or more other network processors within the system, and, if so:
  generate a partially processed data packet and a task message based on the received partially processed data packet and the received task message; and
  transmit the partially processed data packet and the task message to the one or more other network processors.

4. The system of claim 1, wherein the first network processor is configured to generate a partially processed data packet by inserting one or more task messages into data fields of the received packet without performing any task processing on the received data packet.

5. The system of claim 1, wherein the first network processor is configured to generate a partially processed data packet by:
processing, based on one or more tasks, the received data packet; and
inserting one or more task messages into data fields of a processed received packet after performing task processing on the received data packet.

6. The system of claim 4, wherein the corresponding subsequent network processors are configured to extract the task message before processing the partially processed data packet.

7. The system of claim 5, wherein the corresponding subsequent network processors are configured to extract the task message before processing the partially processed data packet.

8. The system of claim 1, wherein the task message includes Ethertype data, Virtual Flow Identification data and task parameter data.

9. The system of claim 8, wherein the task message comprises 16 bytes, the 16 bytes comprising: 2 bytes of Ethertype data, 1 byte of Virtual Flow Identification data and 13 bytes of task parameter data, wherein the:
Ethertype data indicate a partially processed data packet includes a task message;
Virtual Flow identification data indicate information about the task pipeline specified to further process the partially processed data packet; and
task parameter data include information for performing the one or more tasks on the partially processed data packet.

10. The system of claim 1, wherein the first network processor is configured to transmit the partially processed data packet to the corresponding subsequent network processors through an external network switch.

11. In a system having at least two network processors, wherein each network processor has a plurality of processing modules; a method of processing a received data packet, the method comprising:
receiving, by a source network processor, the received data packet;
determining, by the source network processor, zero or more corresponding processing modules of the source network processor for processing the received data packet, wherein the zero or more corresponding processing modules are selected to process the received data packet in a task pipeline based on one or more tasks associated with the received data packet and the tasks are transmitted to the processing modules on a task ring of a network processor;
determining, by the source network processor, whether processing of the data packet should be completed by one or more destination network processors;
generating, by the source network processor, a partially processed data packet based on the received data packet;
inserting, by the processing modules, a task message in the partially processed data packet;
transmitting, by the source network processor, the partially processed data packet and the task message to one or more destination network processors;
receiving, by the one or more destination network processors, the partially processed data packet and the task message;
extract the task message from the partially processed data packet; and
using, by the one or more destination network processors, the extracted task message to further process the partially processed data packet, thereby extending the task ring of the source network processor to the one or more destination network processors.

12. The method of claim 11, wherein the one or more destination network processors, upon receiving a partially processed data packet task message, are configured to:
determine whether processing of the received partially processed data packet should be completed by one or more other destination network processors, and, if so:
generate, a partially processed data packet and a task message based on the received data packet and the received task message; and
transmit the partially processed data packet and the task message to the other one or more other destination processors.

13. The method of claim 11, wherein the source network processor generates a partially processed data packet by inserting one or more task messages into data fields of the received data packet without performing any task processing on the received data packet.

14. The method of claim 11, wherein the source network processor generates a partially processed data packet by:
processing, based on one or more tasks, the received data packet; and
inserting one or more task messages into data fields of a processed received packet after performing task processing on the received data packet.

15. The method of claim 13, wherein the corresponding destination network processors are configured to extract the task message before processing the partially processed data packet.

16. The method of claim 14, wherein the corresponding destination network processors are configured to extract the task message before processing the partially processed data packet.

17. The method of claim 11, wherein the transmission is sent over Ethernet.

18. The method of claim 15, wherein the inserted task message includes Ethertype data, Virtual Flow Identification data and task parameter data.

19. The method of claim 18, wherein the inserted task message comprises 16 bytes, the 16 bytes comprising: 2 bytes of Ethertype data, 1 byte of Virtual Flow Identification data and 13 bytes of task parameter data, wherein the:
Ethertype data indicate a received data packet includes a task message;
Virtual flow Identification data indicate information about the task pipeline specified to process the received data packet; and
task parameter data include information for performing the tasks on the received data packet.

20. A non-transitory machine readable storage medium, having encoded thereon program code, wherein, when the program code is executed by a machine, the machine implements a method of processing a received data packet in a system having at least two network processors, wherein each network processor has a plurality of processing modules, the method comprising:
receiving, by a source network processor, the received data packet;
determining, by the source network processor, zero or more corresponding processing modules of the source network processor for processing the received data packet wherein the zero or more corresponding processing modules are selected to process the received data packet in a task pipeline based on one or more tasks associated with the received data packet and the tasks are transmitted to the processing modules on a task ring of a network processor;

determining, by the source network processor, whether processing of the data packet should be completed by one or more destination network processors;

generating, by the source network processor, a partially processed data packet based on the received data packet;

inserting, by the processing modules, a task message in the partially processed data packet;

transmitting, by the source network processor, the partially processed data packet and the task message to one or more destination network processors;

receiving, by the one or more destination network processors, the partially processed data packet and the task message;

extract the task message from the partially processed data packet; and using, by the one or more destination network processors, the extracted task message to further process the partially processed data packet, thereby extending the task ring of the source network processor to the one or more destination network processors.

* * * * *